United States Patent
Hosseinimakarem et al.

(10) Patent No.: US 11,585,654 B2
(45) Date of Patent: Feb. 21, 2023

(54) TEXTURE DETECTION APPARATUSES, SYSTEMS, AND METHODS FOR ANALYSIS

(71) Applicant: MICRON TECHNOLOGY, INC., Boise, ID (US)

(72) Inventors: Zahra Hosseinimakarem, Boise, ID (US); Jonathan D. Harms, Boise, ID (US); Alyssa N. Scarbrough, Boise, ID (US); Dmitry Vengertsev, Boise, ID (US); Yi Hu, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 378 days.

(21) Appl. No.: 16/890,364

(22) Filed: Jun. 2, 2020

(65) Prior Publication Data
US 2021/0372785 A1 Dec. 2, 2021

(51) Int. Cl.
*G01B 11/25* (2006.01)
*G01B 11/30* (2006.01)

(52) U.S. Cl.
CPC ................. *G01B 11/303* (2013.01)

(58) Field of Classification Search
None
See application file for complete search history.

(56) References Cited

U.S. PATENT DOCUMENTS

| | | | |
|---|---|---|---|
| 10,373,343 B1 | 8/2019 | Pytel et al. | |
| 2004/0263510 A1* | 12/2004 | Marschner | G06T 13/40 345/419 |
| 2006/0269111 A1 | 11/2006 | Stoecker et al. | |
| 2011/0087465 A1* | 4/2011 | Mahfouz | G06K 9/6267 703/2 |
| 2013/0101197 A1* | 4/2013 | Kaftan | G06T 7/0012 382/131 |
| 2017/0065242 A1* | 3/2017 | Chirvasa | A61B 6/466 |
| 2018/0047208 A1 | 2/2018 | Marin et al. | |
| 2018/0197328 A1 | 7/2018 | He et al. | |
| 2019/0184570 A1* | 6/2019 | Yung | B25J 9/163 |
| 2019/0269485 A1 | 9/2019 | Elbaz et al. | |
| 2020/0174583 A1* | 6/2020 | Wang | G06F 3/011 |
| 2021/0207956 A1* | 7/2021 | Shchegrov | H01L 22/20 |

OTHER PUBLICATIONS

ISR/WO dated Sep. 1, 2021 for PCT Appl. No. PCT/US2021/031740.

* cited by examiner

*Primary Examiner* — Eileen M Adams
(74) *Attorney, Agent, or Firm* — Dorsey & Whitney LLP

(57) ABSTRACT

Embodiments of the disclosure are drawn to projecting light on a surface and analyzing the scattered light to obtain spatial information of the surface and generate a three dimensional model of the surface. The three dimensional model may then be analyzed to calculate one or more surface characteristics, such as roughness. The surface characteristics may then be analyzed to provide a result, such as a diagnosis or a product recommendation. In some examples, a mobile device is used to analyze the surface.

37 Claims, 6 Drawing Sheets

TEXTURE DETECTION APPARATUSES, SYSTEMS, AND METHODS FOR ANALYSIS

BACKGROUND

Analysis of surface texture (e.g., roughness, waviness) is used in a variety of industries. For example, surface texture may be analyzed to confirm adequate polishing of bearing surfaces during manufacturing to reduce friction. In another example, surface texture may be analyzed to confirm proper application of a coating to a surface (e.g., paint). Data on surface texture may be acquired by a variety of methods including interferometry, electrical capacitance, high resolution imaging, confocal microscopy and electron microscopy. Acquiring the data to calculate various characteristics of the surface texture may require specialized equipment. This may reduce the availability and/or increase the cost of analyzing surface texture. Accordingly, techniques for analyzing surface texture with less expensive and/or more readily available equipment may be desired.

DETAILED DESCRIPTION

The following description of certain embodiments is merely exemplary in nature and is in no way intended to limit the scope of the disclosure or its applications or uses. In the following detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

An emerging area of interest for surface texture analysis is analyzing surface characteristics of biological tissue such as skin. Surface roughness, waviness, maximum peak height, grain size, lesion (e.g., pimple, insect bite, scar, mole, cancer) size, a number of lesions, and/or other surface characteristics may provide information on the health of the tissue. For example, roughness and/or grain size may be different between normal skin and cancerous skin (e.g., melanoma, squamous cell carcinoma). However, similar to non-biological applications for analyzing surface texture, the techniques for analyzing surface texture of biological tissues may require specialized equipment, which may limit the ability to acquire data on surface texture of biological tissue.

According to examples of the present disclosure, a mobile device may be used to acquire surface texture data and calculate one or more surface characteristics from the data. In some examples, the mobile device may further analyze the surface characteristics to provide a product recommendation and/or a diagnosis. In the case of a biological tissue, a product recommendation may include a cosmetic product (e.g., a moisturizer, toner, cleanser) and a diagnosis may include a disease and/or condition (e.g., cancer, infection, allergic reaction). In non-biological tissue, a product recommendation may include a process or setting (e.g., additional time in a polishing machine, use of a particular grain sandpaper) and a diagnosis may include a state of the product (e.g., defective, acceptable). In some examples, the product recommendation and/or diagnosis may be generated by a machine learning model based on the surface characteristics.

Figure 1:
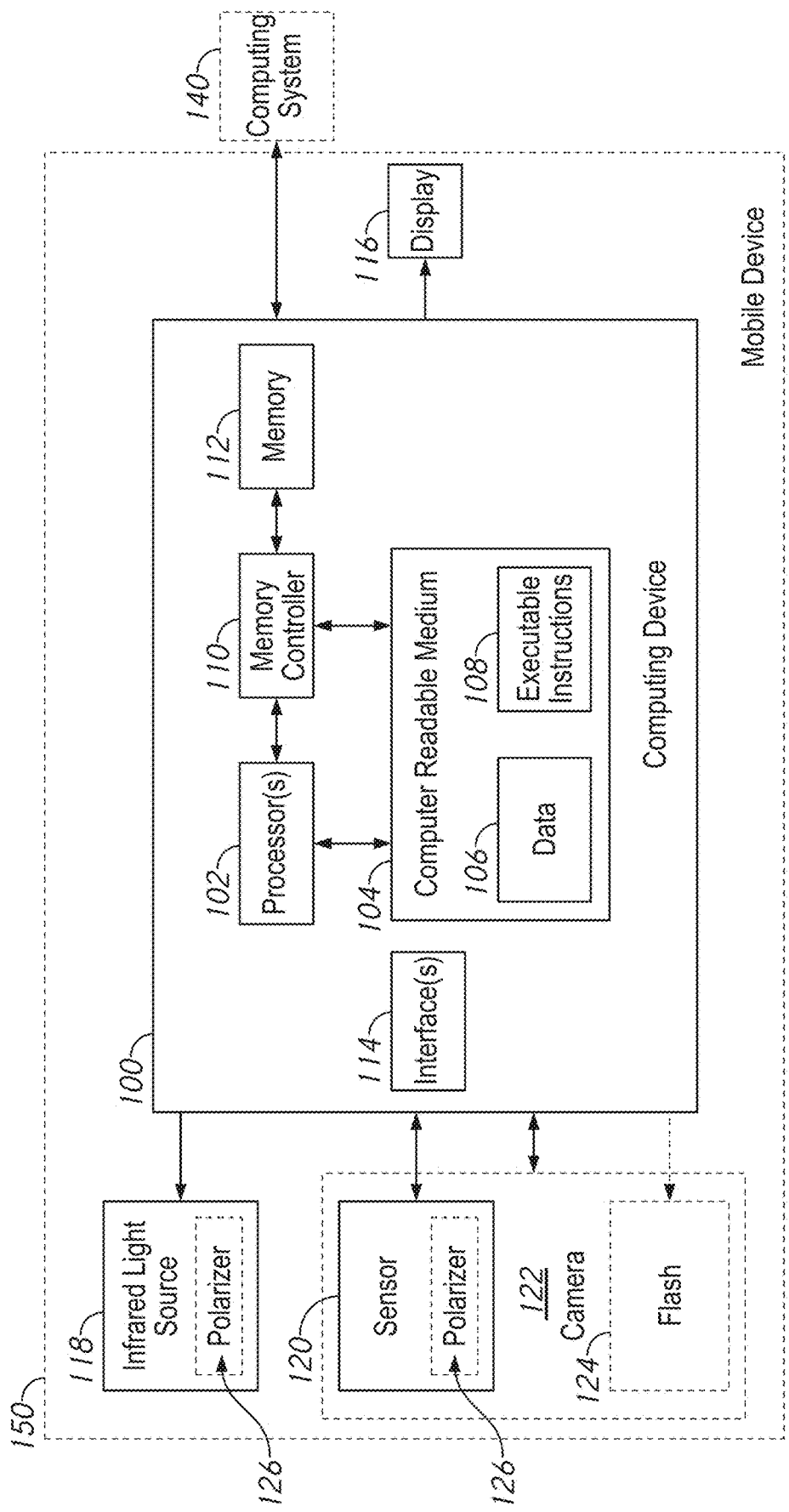
FIG. 1 is a schematic illustration of a computing device 100 arranged in accordance with examples of the present disclosure.

FIG. 1 is a schematic illustration of a computing device 100 arranged in accordance with examples of the present disclosure. The computing device 100 may include processor(s) 102, a computer readable medium (or media) 104, a memory controller 110, a memory 112, and interface(s) 114. In some examples, the computing device 200 may include and/or be communicatively coupled to a display 116, an infrared light source 118, and/or a sensor 120. In some examples, the computing device 200 may optionally include and/or be communicatively coupled to a camera 122 and/or a flash 124. In some examples, the computing device 100 may be included in a mobile device 150, such as a smart phone, gaming device (e.g., Nintendo Switch), or tablet. As shown in FIG. 1, in some examples, the computing device 100, sensor 120, infrared light source 118, and display 116 may all be included in a single device/enclosure, such as mobile device 150. In some examples, some or all of the components may be included on a same substrate, for example, processor 102 and sensor 120. In some examples, the computing device 100 may be implemented wholly or partially using a computer, a server, television, or a laptop.

The computer readable medium 104 may be accessible to the processor(s) 102. The computer readable medium 104 may be encoded with executable instructions 108. The executable instructions 108 may be executed by the processor 102. In some examples, the executable instructions 108 may cause the processor 102 to provide commands to the infrared light source 118, sensor 120, camera 122, and/or flash 124 in order to acquire signals and/or an image of a surface. In some examples, the executable instructions 108 may cause the processor 102 to generate a three dimensional (3D) model of a surface, for example, from signals received from sensor 120. In some examples, the executable instructions 108 may cause the processor 102 to analyze the 3D model to calculate a value of a characteristic of a surface. In some examples, the executable instructions 108 may cause the processor 102 to implement a machine learning application that includes one or more machine learning models. The machine learning application may implement various functions such as generating a result based, at least in part, on the value of the surface characteristic (e.g., make an inference). Alternatively or additionally, in some examples, the machine learning application, or a portion thereof, may be implemented in hardware included with the computer readable medium 104 and/or processor(s) 102, for example, application-specific integrated circuits (ASICs) and/or field programmable gate arrays (FPGA).

The computer readable medium 104 may store data 106. In some examples, the data 106 may include signals received from sensor 120, an image received from camera 122, a 3D model generated by the processor 102, a value of a surface characteristic calculated by the processor 102, one or more databases of values of surface characteristics, and/or a result generated by the machine learning application. The computer readable medium 104 may be implemented using any medium, including non-transitory computer readable media. Examples include memory, random access memory (RAM), read only memory (ROM), volatile or non-volatile memory, hard drive, solid state drives, or other storage. While a single medium is shown in FIG. 1, multiple media may be used to implement computer readable medium 104.

In some examples, the processor(s) 102 may be implemented using one or more central processing units (CPUs), graphical processing units (GPUs), ASICs, FPGAs, or other processor circuitry. In some examples, the processor(s) 102 may execute some or all of the executable instructions 108. In some examples, the processor(s) 102 may be in communication with a memory 112 via a memory controller 110. In some examples, the memory 112 may be volatile memory, such as dynamic random access memory (DRAM). The memory 112 may provide information to and/or receive information from the processor(s) 102 and/or computer readable medium 104 via the memory controller 110 in some examples. While a single memory 112 and a single memory controller 110 are shown, any number may be used. In some examples, the memory controller 110 may be integrated with the processor(s) 102.

In some examples, the interface(s) 114 may provide a communication interface to another device (e.g., infrared light source 118), a user, and/or a network (e.g., LAN, WAN, Internet). The interface(s) 114 may be implemented using a wired and/or wireless interface (e.g., Wi-Fi, BlueTooth, EIDMI, USB, etc.). In some examples, the interface(s) 114 may include user interface components which may receive inputs from a user. User inputs may include, but are not limited to, desired resolution, selection of one or more region of interests, and desired output (e.g., diagnosis, product recommendation). Examples of user interface components include a keyboard, a mouse, a touch pad, a touch screen, and a microphone. For example, a user may review an image of a subject's face on the display 116, which may be a touch screen in some examples, and circle an area of interest on the image. In some examples, the interface(s) 114 may communicate information, which may include user inputs, data 106, signals, images, and/or commands, between external devices (e.g., camera 122) and one or more components of the computing device 100 (e.g., processor 102 and computer readable medium 104).

In some examples, the computing device 100 may be in communication with a display 116 that is a separate component (e.g., using a wired and/or wireless connection) or the display 116 may be integrated with the computing device. In some examples, the display 116 may display data 106 such as outputs (e.g., results) generated by one or more machine learning models implemented by the computing device 100, 3D models generated by the processor 102, and/or images acquired by the camera 122. In some examples, the processor 102 may execute commands to implement a graphical user interface (GUI) that is provided on the display 116. Any number or variety of displays may be present, including one or more LED, LCD, plasma, or other display devices. In some examples, the display 116 may be a touch screen which may allow a user to provide user inputs via the GUI (e.g., select regions of interest on a surface).

In some examples, the infrared light source 118 may include an infrared light emitting diode (LED). In some examples, the infrared light source 118 may include a dot projector. That is, the infrared light source 118 may project infrared light on a surface as multiple discrete dots. In some examples, the dot projector may include diffractive optics (e.g., diffraction grating) that generates the dots from the infrared light source 118. The dots may have the same initial diameter or different diameters. By initial diameter, it is meant the diameter of the dot at the infrared light source 118 as the dot may "spread" as the distance between the infrared light source 118 and the surface increases. The dots may be circular, elliptical, squares, and/or other shapes. The dots may be projected in a variety of patterns, for example, a grid, concentric circles, and/or spiral. The dots may be spaced uniformly or with varying density (e.g., some regions over which the dots are projected may have dots more closely spaced than others). In some examples, the infrared light source 118 may project tens of dots, hundreds of dots, thousands of dots, or tens of thousands of dots of infrared light. In some examples, the infrared light source 118 may project multiple patterns of dots that are then stitched together. For example, a surface may be illuminated with multiple grids of dots and the grids may be stitched together by the computing device 100 to provide data on the entire surface. The multiple grids may be projected at the same time or in series. For example, when a surface is larger than the size of the pattern of dots that can be projected with a desired resolution, the infrared light source 118 may illuminate different portions of the surface at different times. In some examples, an overall shape of the surface or stitching of the patterns of dots may be based, at least in part, on changes in aberration in the low frequency range of spatial frequencies.

In other examples, the infrared light source 118 may illuminate (e.g., irradiate) a surface with infrared light in a non-discrete manner (e.g., an unfocused or semi-focused beam). In some examples, the infrared light source 118 may be a coherent light source. Optionally, in some examples, the infrared light source 118 may project polarized light onto the surface. In some examples, the infrared light source 118 may include a polarizer 126 (e.g., polarizing filter, polarization conversion plate) to generate the polarized light. In some examples, the infrared light source 118 may project infrared light responsive to one or more commands provided by the processor 102.

The sensor 120 may detect infrared light in some examples. In some examples, the sensor 120 may detect visible light. In some examples, the sensor 120 may detect a broad range of wavelengths (e.g., from infrared to ultraviolet wavelengths). In some examples, the sensor 120 may include multiple sensors to detect light at different wavelengths (e.g., a sensor to detect infrared, a sensor to detect visible, and/or a sensor to detect ultraviolet). The sensor 120 may include a light dependent resistor, a photodiode, a phototransistor, a charged-couple device (CCD), complementary metal oxide semiconductor (CMOS) sensor, and/or other light sensor. The sensor 120 may generate electrical signals responsive to infrared light, such as infrared light emitted from the infrared light source 118 that is scattered off a surface back toward the sensor 120. Optionally, in some examples, when polarized light is desired, instead of the polarizer 126 being included with the infrared light source 118, the polarizer 126 may be included with the sensor 120 so that the scattered light is polarized prior to being detected by the sensor 120. In some applications, when the polarizer 126 is in the path of the sensor 120 rather than the infrared light source 118, the polarizer may be referred to as an analyzer.

In some examples, the sensor 120 may be included in a camera 122. The sensor 120 may generate signals responsive to ambient light, infrared light from the infrared light source 118, and/or flash 124 incident on the sensor 120. The signals may be used to generate an image, for example, an image of a surface. In some examples, the sensor 120 may detect light and/or provide electrical signals to the computing device 100 responsive to one or more commands provided by the processor 102.

Optionally, the flash 124 may emit light for acquiring an image with the camera 122. For example, the flash 124 may be used when the ambient light is too low to acquire an image with acceptable signal-to-noise. The flash 124 may include a visible light source, an infrared light source, an ultraviolet light source, and/or a broad spectrum light source (e.g., includes two or more of visible light, infrared light, and ultraviolet light). In some examples, the flash 124 may include an LED, a xenon flash tube, and/or other light source. In some examples, the flash 124 may be included with the camera 122. In some examples, the flash 124 may emit light for a preconfigured duration responsive to a command provided by the camera 122 and/or one or more commands provided by the processor 102.

In some examples, the executable instructions 108 may cause the processor 102 to provide commands (e.g., via the interface(s) 114) to the infrared light source 118 and/or sensor 120. The commands may cause the infrared light source 118 to project infrared light onto a surface and the sensor to detect signals generated by the infrared light scattering (e.g., reflecting) off the surface. The signals may be provided from the sensor 120 to the processor 102 (e.g., via the interface(s) 114) and/or the computer readable medium 104. The signals generated responsive to the infrared light being scattered and/or reflected off the surface back to the sensor 120 may provide spatial information of the surface (e.g., contours). In some examples, the signals may provide additional information regarding the surface (e.g., oily versus dry).

The executable instructions 108 may cause the processor 102 to generate a 3D model of the surface based on the received signals (e.g., the spatial information provided by the signals). In some examples, the 3D model may be analogous to a topographical map of the surface. In examples where an image of the surface is acquired, the processor 102 may analyze the image to generate the 3D model. For example, the processor 102 may utilize image processing techniques to detect light and dark areas which may indicate contours of the surface (e.g., light areas may indicate peaks and dark areas may indicate valleys). In some examples, the processor 102 may analyze the image and the signals from the scattered infrared light to generate the 3D model. In some examples, the signals from the infrared light may be used to generate the 3D model and the image from the camera may be overlaid on a surface of the 3D model. In some examples, the 3D model may be provided to the computer readable medium 104 for storage. In some examples, the 3D model may be provided to the processor 102.

The executable instructions 108 may cause the processor 102 to analyze the 3D model to calculate one or more values for one or more characteristics of the surface (e.g., surface characteristics). Examples of surface characteristics include roughness, maximum peak height, grain size, lesion size, number of lesions, spatial frequency (e.g., what spatial frequencies are present), and waviness. In examples where an image of the surface is acquired, the processor 102 may analyze the image to calculate the one or more values for one or more surface characteristics.

Surface roughness may be calculated in a variety of ways. For example, roughness may be calculated using an arithmetical mean deviation based on the 3D model of the surface as shown in Equation 1 below:

$$Ra = \frac{1}{n}\sum_{i=1}^{n}|y_i| \quad (1)$$

Where Ra is the surface roughness, n is a number of equally spaced sample points along the surface defined by the 3D model, $y_i$ is a vertical distance from a mean line to the $i^{th}$ data point. The mean line of the 3D model is an average "elevation" of the surface represented by the 3D model. In some examples, all n are in a line along the 3D model (e.g., a trace), and the mean line is an average elevation for the 3D model along the line. In some examples, n are in a grid along the 3D model (e.g., multiple traces). In these examples, there may be multiple mean lines calculated for each row of the grid of sample points n or the mean line may actually be a two-dimensional (2D) plane calculated based on all or a portion of the 3D model. Whether the mean line is a line or a plane, for each sample point n on the surface, a vertical distance (y) between that point and the mean line is measured. Each y indicates how far an elevation of a sample point n deviates from the mean elevation of the surface. For example, if a sample point n of the surface is in a "valley" that dips below a mean elevation of the surface, y is the vertical distance between that sample point in the valley to the mean elevation line. Thus, Ra provides an average of how far the sample points n of the surface deviate from the mean elevation of the surface as a measure of surface roughness. A large Ra indicates deeper valleys and/or higher peaks than a smaller Ra.

In another example, roughness may be calculated using a root mean squared (RMS) technique based on the 3D model of the surface as shown in Equation 2 below:

$$Rq = \sqrt{\frac{1}{n}\sum_{i=1}^{n}y_i^2} \quad (2)$$

Where Rq is the surface roughness and n, i, and $y_i$ have the same meanings as in Equation 1. In Equation 2, instead of the average deviations of elevation of the sample points n being used as a measure of surface roughness, each deviation); from the mean elevation is squared prior to summing and averaging. The square root of the averaged sum is then taken to yield Rq. Ra and Rq are provided merely as examples, and other techniques for calculating surface roughness may also be used, such as maximum valley depth (e.g., lowest value of y for all n), maximum peak height (e.g., highest value of y for all n), skewness (e.g., a measurement of the asymmetry of the distribution of elevation deviations), and/or kurtosis (e.g., a measurement of outliers in the elevation deviations). In some examples, multiple surface roughness values may be calculated, each based on a different technique.

In some examples, waviness may be calculated by comparing the 3D model and/or image to standard images and/or standard sampling. For example, International Organization for Standardization (ISO) standard 10110, ISO standard 4287, and/or American Society of Mechanical Engineers (ASME) B46.1. In other examples, the waviness may be calculated similar to surface roughness with more widely spaced sample points.

In some examples, grain size, lesion size, and/or number of lesions may be calculated using a watershed algorithm on the 3D model and/or image. The watershed algorithms use various techniques to find lines that define the tops of "ridges" and areas of "basins" between or surrounded by ridges based on the heights of points in the 3D model and/or brightness of pixels in the image. Examples of watershed algorithms that may be used include topological watershed, priority-flood, and watershed cuts.

In some examples, the processor 102 may analyze both the 3D model and the image to calculate the values of the surface characteristics. For example, the processor 102 may apply image segmentation techniques to the image to locate lesions or other regions of interest (e.g., nose) and/or eliminate regions from analysis eyebrows). The processor 102 may then analyze the 3D model at the lesion sites, regions of interest, and/or regions not eliminated based on analysis of the image. Examples of suitable image segmentation techniques include, but are not limited to, random forest, U-net, Yolo v103, and/or combinations thereof.

In some examples, prior to calculating the surface characteristics, the processor 102 may preprocess the 3D model and/or the image. For example, the 3D model may be flattened, scaled, and/or denoised. Similarly, the image may be processed for contrast enhancement, scaling, denoising, and/or other filtering. In some examples, prior to calculating the surface characteristics, the processor 102 may analyze the 3D model and/or the image to subtract an overall shape from the 3D model, By overall shape, it is meant the overall shape of the surface, which may not provide meaningful information on surface characteristics. For example, when the surface is a person's face and the entire face or a large portion of the face is illuminated, the overall shape of the face or portion of the face (e.g., contour of cheek or jaw) may not provide meaningful information for the surface characteristics of the skin of the person's face. Accordingly, the overall shape, typically low-frequency spatial signals, are subtracted from the 3D model prior to calculating the surface characteristics.

In some examples, the executable instructions 108 may cause the processor 102 to implement a machine learning application that analyzes the one or more values of surface characteristics calculated by the processor 102 and makes one or more inferences based on one or more values of surface characteristics to generate a result. The result may be, or included in, a data set associated with the 3D model and/or the calculated surface characteristics in some examples. The machine learning application may implement one or more machine learning models. Examples of machine learning models include, but are not limited to, neural networks, decision trees, and support vector machines. In some examples, the result may include a diagnosis. For example, the machine learning application may infer that the values of surface characteristics of a tissue (e.g., skin) indicate that the tissue is cancerous. In some examples, the result may include a product recommendation. For example, the result may provide a recommendation of a moisturizer based, at least in part, on values of surface characteristics. In some examples, the result may include both a diagnosis and a product recommendation. For example, based on the one or more values of surface characteristics of a subject's skin, the machine learning application may infer that the subject has psoriasis and provide the diagnosis as well as a medication to treat the condition as the product recommendation.

In some examples, instead of or in addition to implementing a machine learning application, the result may be generated by comparing the one or more values of surface characteristics to a database of values of surface characteristics. For example, the one or more values of surface characteristics may be compared to the values in the database. The processor 102 may provide a result associated with the closest match of values in the database. The database of values of surface characteristics may be static or it may be updated, for example, by user inputs (e.g., feedback). Examples of user inputs include reviews of product recommendations, doctor diagnoses, and new product specifications.

Optionally, in some examples, the machine learning model may be used to calculate one or more values of one or more surface characteristics based, at least in part, on the 3D model and/or image.

Optionally, in some examples, the computing device 100 may be in communication with a computing system 140. The computing system 140 may include one or more computing devices. In some examples, the computing system 140 may be a cloud computing system. In these examples, the computing device 100 may provide the signals, images, and/or surface characteristics to the computing system 140. The computing system 140 may generate the 3D model, calculate the surface characteristics, and/or analyze the surface characteristics with a machine learning model. The computing system 140 may then provide the 3D model, surface characteristics, and/or results from the machine learning model back to the computing device 100. In some examples, the computing system 140 may include the database of surface characteristics. This arrangement may be desirable in some applications, for example, computing device 100 may have limited computational ability, such as if computing device 100 is included with a compact mobile device 150. This arrangement may be more convenient for when the machine learning model is dynamically trained and/or the database is dynamically updated.

Optionally, the computing device 100 and/or computing system 140 may receive subsurface information. For example, subsurface information may be provided by optical coherence tomography (OCT) or elastic scattering spectroscopy (ESS). This data may be provided by optional light sources and sensors coupled to the computing device 100 and/or from separate equipment that provides the subsurface information to the computing device 100 and/or computing system 140 for analysis. Subsurface information may be analyzed similar to data of the illuminated surface to find surface characteristics of one or more layers below the surface. For example, subsurface information may be used to find characteristics of one or more layers of skin (e.g., stratum corneum, stratum lucidutn, stratum spinosum).

Figure 2:
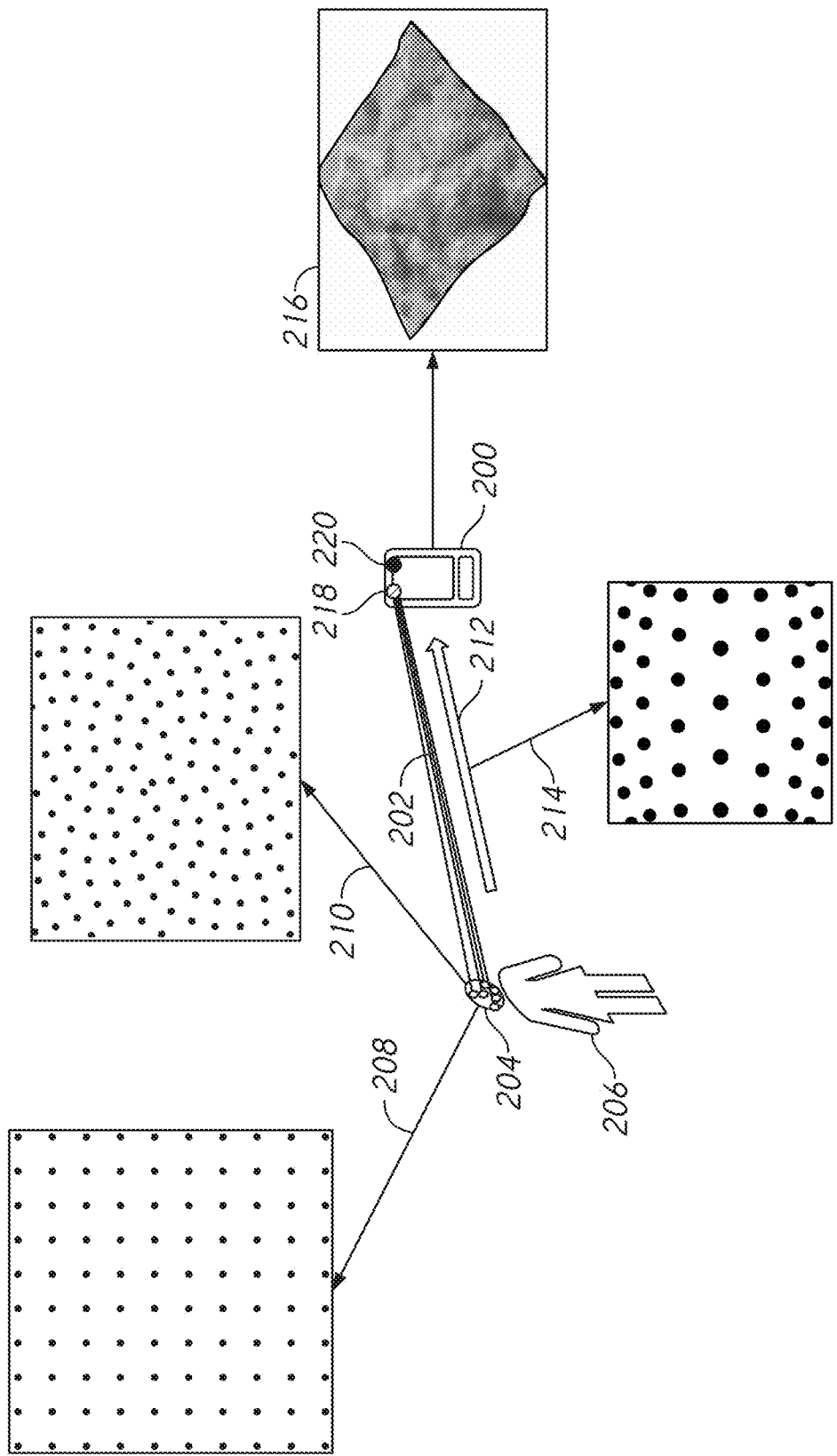
FIG. 2 illustrates techniques for acquiring spatial information of a surface in accordance with examples of the present disclosure.

FIG. 2 illustrates techniques for acquiring spatial information of a surface in accordance with examples of the present disclosure. In some examples, light 202, such as infrared light, may be emitted from a light source 218 of a mobile device 200 onto a surface 204. In some examples, light source 218 may include light source 118 shown in FIG. 1. In the example shown, the surface 204 is the skin of a subject 206. In some examples, mobile device 200 may include computing device 100. In some examples, mobile device 200 may include mobile device 150.

In some examples, the light 202 may be emitted as a projection of dots (e.g., spots) onto the surface 204. Two example dot projection patterns 208 and 210 are shown. Dot projection pattern 208 is a grid and dot projection pattern 210 is a spiral. However, other dot projection patterns may be used in other examples. While the projections are referred to as dots herein, it is to be understood that light may be emitted so as to generate a dot of any shape. In some examples, the light 202 may be polarized (e.g., by polarizer 126) prior to being projected onto the surface 204. The light 202 may be scattered (e.g., reflected) off the surface 204. The scattered light 212 may be received by a sensor 220. In some examples, sensor 220 may include sensor 120 shown in FIG. 1. In some examples, the scattered light 212 may be polarized by a polarizer (e.g., polarizer 126) prior to being received by the sensor.

In some examples, the signals received from the sensor may indicate an intensity of scattered light from the multiple dots projected on the surface 204. The differing intensities of the dots (independently and/or in relation to one another) may provide spatial information of the surface. For example, low intensities of scattered light for particular dots may indicate those dots are farther away from the light source and/or device 200 than dots associated with high intensities of scattered light. In some examples, phase differences in the scattered light between dots may provide spatial information for the surface. In some examples, the polarization state of the scattered light 212 and/or dots may provide spatial information of the surface and/or enhance the spatial information provided by the intensity and phase information.

In some examples, as illustrated in box 214, differences in size of the dots relative to one another and/or differences in spacing between dots reflected back to the device 200 may provide spatial information of the surface 204. For example, a larger dot may indicate a portion of the surface 204 is farther away than a portion of the surface 204 associated with a smaller dot because the light 202 associated with the larger dot had a greater distance over which to spread. In some examples, differences in shapes in the dots may provide spatial information for the surface 204 (e.g., contours of the surface 204 reflect the light 202 to "warp" the appearance of the dots at the sensor).

In some examples, the light 202 need not be projected as dots. Rather, the light 202 may be emitted as a loosely focused beam on the surface 204 or may be emitted as more tightly focused beam scanned (e.g., projected and translated) over the surface 204. Differences in intensity and/or phase at different locations of the surface 204 may be analyzed and/or other specular reflection analysis techniques may be used to extract spatial information for the surface 204.

Based on the spatial information acquired from the signals responsive to the light 202 scattered from the surface 204, the mobile device 200 may generate a 3D model 216 of the surface 204.

A distance between the device 200 and the surface 204 may be based, at least in part, on the information desired by the user. For example, skin firmness is related to low frequency errors in the spatial frequencies. The fewer low frequency errors, the higher the firmness. In order to acquire data on low frequencies of the surface 204, data may be acquired from a large portion of the face (e.g., one or more cheeks, majority of forehead). Thus, the distance between device 200 and surface 204 may be greater than when a small area is analyzed to allow the light 202 to be projected across a larger area. In contrast, if analysis of a lesion (e.g., suspicious mole) is performed, a smaller area may be of interest, and the device 200 may be placed closer to the surface 204.

Figure 3:
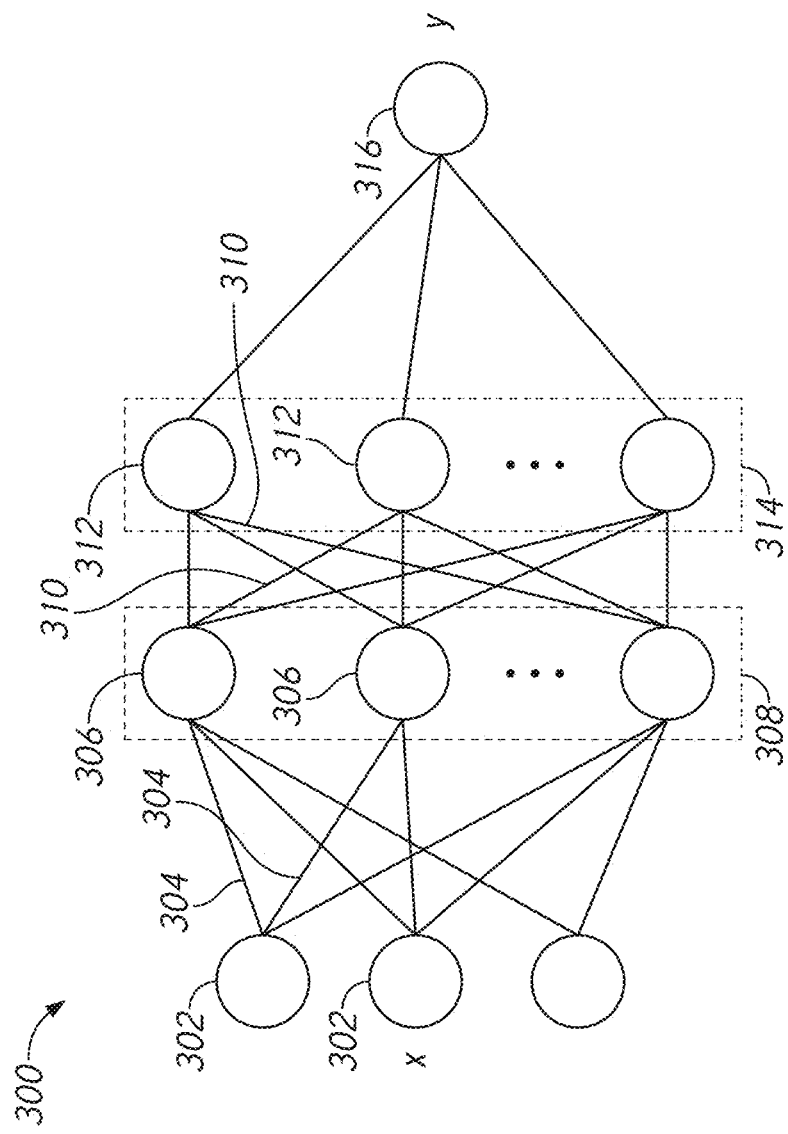
FIG. 3 is an example of a machine learning model in accordance with examples of the present disclosure.

FIG. 3 is an example of a machine learning model in accordance with examples of the present disclosure. In the example shown in FIG. 3, the machine learning model includes a neural network 300. In some examples, the neural network may be implemented by computing device 100 and/or mobile device 200. In some examples, neural network 300 may be a convolutional network with three dimensional layers. The neural network 300 may include input nodes 302. In some examples, the input nodes 302 may be organized in a layer of the neural network 300. The input nodes 302 may be coupled to one or more layers 308 of hidden units 306 by weights 304. In some examples, the hidden units 306 may perform operations on one or more inputs x from the input nodes 302 based, at least in part, with the associated weights 304. In some examples, the hidden units 306 may be coupled to one or more layers 314 of hidden units 312 by weights 310. The hidden units 312 may perform operations on one or more outputs from the hidden units 306 based, at least in part, on the weights 310. The outputs of the hidden units 312 may be provided to an output node 316 to provide a result y.

In some examples, the input x may include one or more values for one or more surface characteristics (e.g., roughness, waviness). In some examples, the result y may include one or more diagnoses and/or product recommendations. In some examples, the result may be included in a dataset associated with the 3D model and/or surface characteristics calculated from the 3D model.

In some examples, the neural network 300 may be trained by providing one or more training data sets. The neural network 300 may be trained by the computing device used to make inferences with the neural network in some examples (e.g., by computing device 100, computing system 140, and/or mobile device 200). In some examples, the neural network 300 may be trained by another computing device to determine weights and/or node arrangements or other neural network configuration information, and the weights and/or other neural network configuration information provided to the computing device used to make inferences.

In some examples, the neural network 300 may be trained using supervised learning techniques. In some examples, training data may include a set of inputs x, each associated (e.g., tagged) with a desired result y. Each input x may include one or more values for one or more surface characteristics. For example, one input x may include a value of roughness and a value of grain size associated with a result)) that is a diagnosis of basal cell carcinoma. Based on the training data set, the neural network 300 may adjust one or more weights 304, 310, number of hidden units 306, 312 and/or number of layers 308, 314 of the neural network 300. The trained neural network 300 may then be used to make inferences on inputs x (that are not associated with desired results) to generate results y.

In some examples, the neural network 300 may be dynamically trained. That is, the neural network 300 may continue to adjust the one or more weights 304, 310, number of hidden units 306, 312 and/or number of layers 308, 314 based on new data. For example, a user intervention (e.g., a doctor entering a diagnosis of a lesion having particular surface characteristics) may cause the neural network 300 to adjust. Furthermore, in some examples, the machine learning model may be trained using semi-supervised and/or unsupervised techniques. In these examples, data sets may not include a desired result associated with every input.

The machine learning model shown in FIG. 3 is provided merely as an example and the present disclosure is not limited to the neural network 300. For example, the machine learning model may include multiple neural networks 300 and/or other machine learning models (e.g., support vector machine). In some examples, the machine learning model may include different machine learning models for different applications. For example, there may be a machine learning model for cosmetic applications (e.g., determining cosmetic product recommendations) and a separate machine learning model for medical applications (e.g., determining a diagnosis for a lesion).

Figure 4:
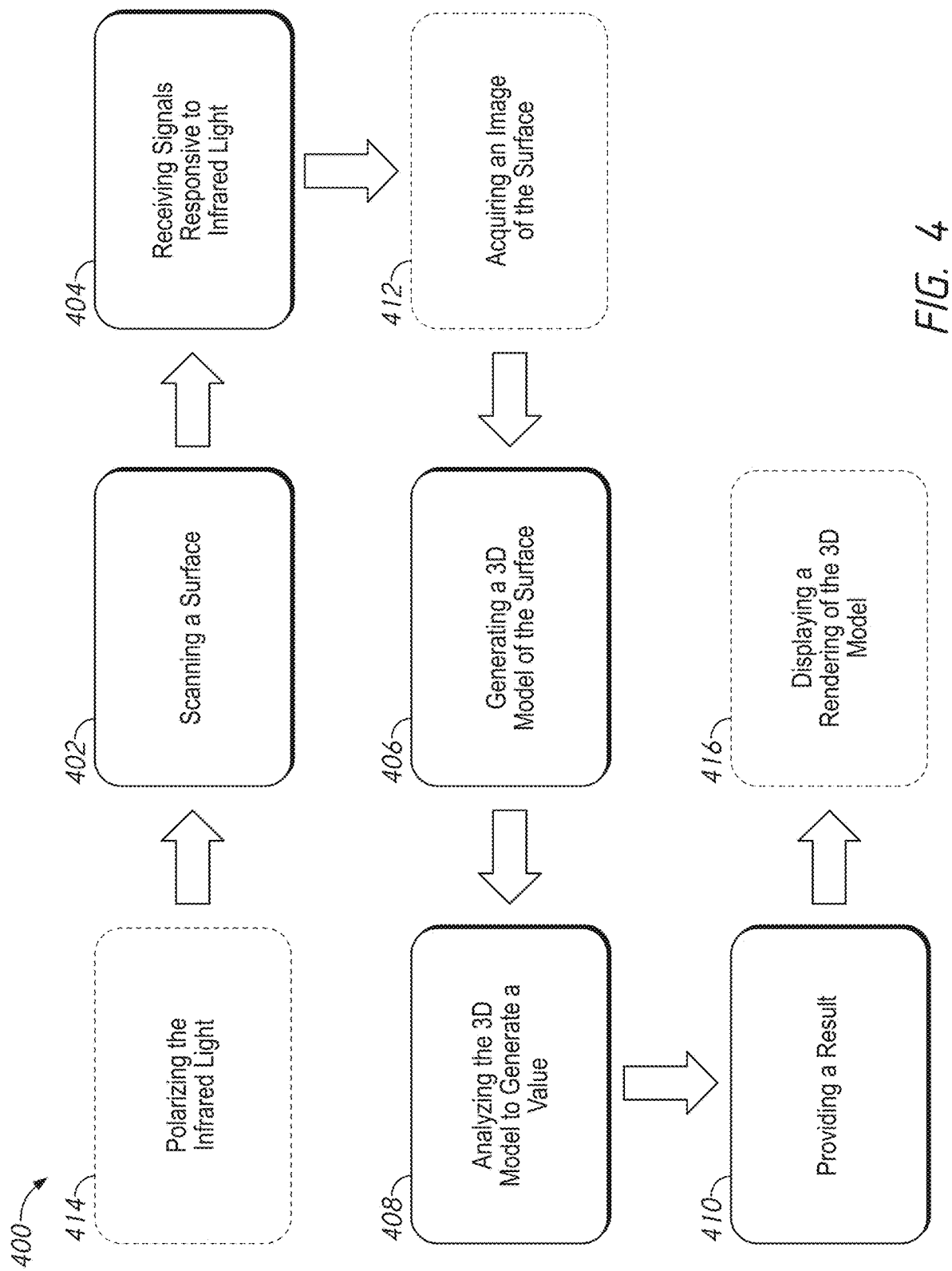
FIG. 4 is a flowchart of a method in accordance with examples of the present disclosure.

FIG. 4 is a flowchart of a method 400 in accordance with examples of the present disclosure. In some examples, the method 400 may be performed by mobile device 150 and/or mobile device 200.

At block 402, "scanning a surface" may be performed. In some examples, the scanning may be performed with an infrared light source (e.g., infrared light source 118) of a mobile device. Scanning may include illuminating the surface with dots, a loosely focused beam, and/or a tightly focused beam. In some examples, the surface may be a tissue, such as skin. However, in other examples, the surface may be non-living such as a surface of a diamond or a paint coating.

At block 404, "receiving signals responsive to infrared light" may be performed. The signals may be generated by a sensor (e.g., sensor 120) of the mobile device responsive to the infrared light source scattering on the surface and incident on the sensor. In some examples, the signals may be provided to a processor (e.g., processor(s) 102) of the mobile device.

At block 406, "generating a 3D model of the surface" may be performed. The 3D model may be generated by the processor based, at least in part, on the signals. At block 408, "analyzing the 3D model to generate a value" may be performed. In some examples, the analyzing may be performed by the processor. In some examples, the value may be a value for at least one characteristic of the surface. In some examples, the characteristic of the surface may include a roughness of the surface, a maximum peak height, a grain size, a lesion size, a number of lesions, and/or a waviness. In some examples, only a portion of the 3D model may be analyzed to generate the value. For example, only a region of interest indicated by a user input (e.g. via interface 114) may be analyzed to generate the value. In another example, only a region of the 3D model corresponding to a region segmented in an image (e.g., a lesion segmented from an image of the face) may be analyzed to generate the value.

At block 410, "providing a result" may be performed. In some examples, the result may be based, at least in part, on the value. The result may be part of a data set, which may be associated with the 3D model and/or the calculated surface characteristics in some examples. In some examples, the result may include a product recommendation and/or a diagnosis. The product recommendation and/or diagnosis may be data included in the data set. In some examples, comparing the value for the at least one characteristic of the surface to values in a database may be performed to generate the result. In sonic examples, analyzing the value for the at least one characteristic of the surface with a machine learning model may be performed to generate the result. In some examples, the result may be provided on a display (e.g., display 116) of the mobile device.

Optionally, at block 412, "acquiring an image of the surface" may be performed. In some examples, the image may be acquired with a camera (e.g., camera 122) of the mobile device. In some examples, block 412 is performed concurrently with block 402. In some examples, block 412 is performed before block 402. In some examples, the 3D model of the surface may be based, at least in part, on the image. In some examples, the image may be analyzed to generate the value for the at least one characteristic of the surface and/or another value for at least one characteristic of the surface. In some examples, the image may be acquired with a flash (e.g., flash 124) of the mobile device.

Optionally, at block 414, "polarizing the infrared light" may be performed. In some examples, the infrared light may be polarized by a polarizer (e.g., polarizer 126). In some examples, block 414 is performed before block 402. In some examples, block 414 is performed after block 402 and before block 404. Optionally at block 416, "displaying a rendering of the 3D model" may be performed. The rendering may be displayed on the display. In some examples, block 416 is performed before block 410. In some examples, block 416 is performed concurrently with block 410.

Figure 5:
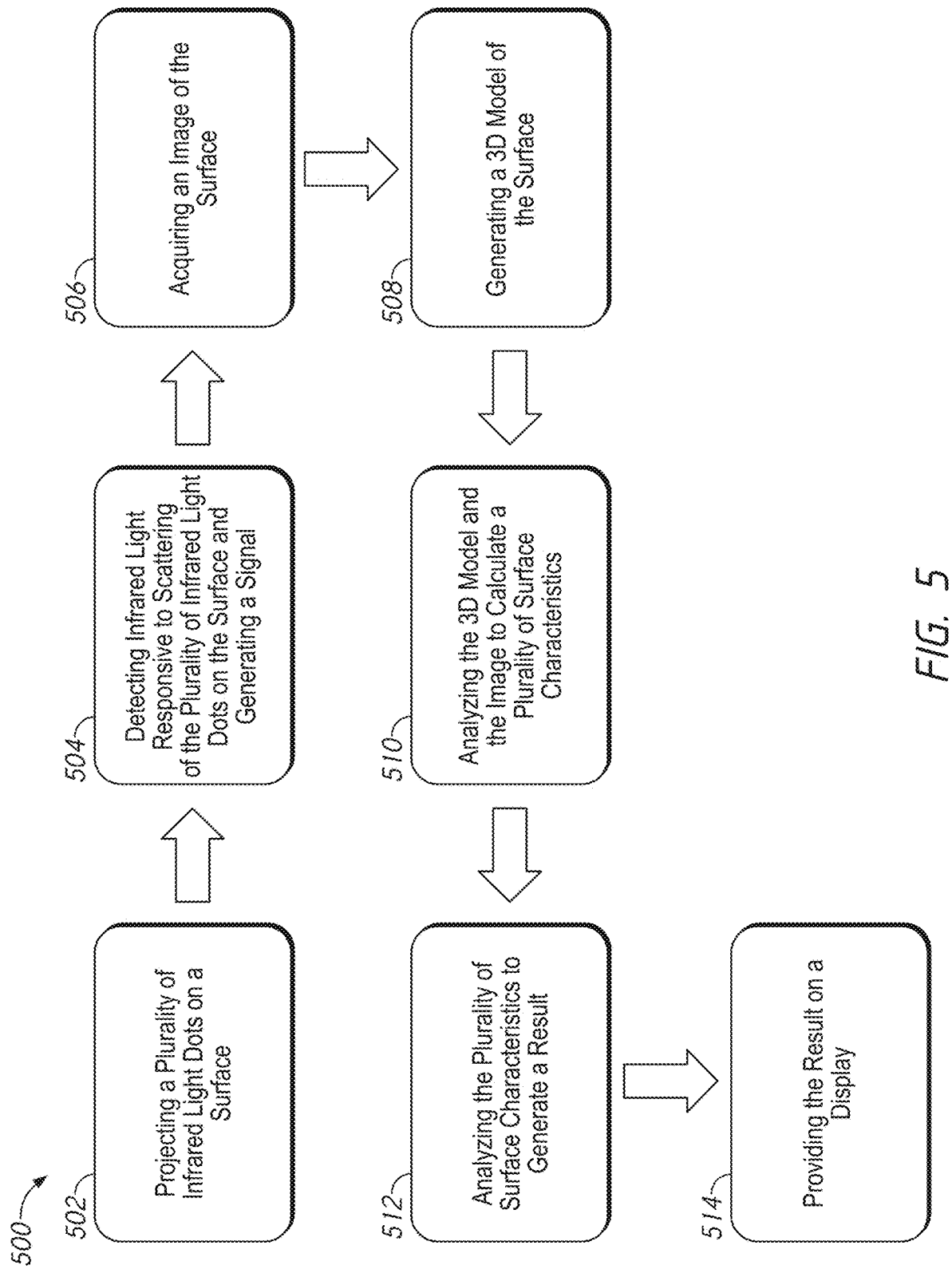
FIG. 5 is a flowchart of a method in accordance with examples of the present disclosure.

FIG. 5 is a flowchart of a method 500 in accordance with examples of the present disclosure. In some examples, some or all of the method 500 may be performed by computing device 100, mobile device 150, and/or mobile device 200.

At block 502, "projecting a plurality of infrared light dots on a surface" may be performed. The dots may be projected by an infrared light source (e.g., 118) in some examples. The dots may be projected as a grid, a spiral, and/or other pattern. The dots may be uniformly or non-uniformly spaced. In some examples, the infrared light is polarized.

At block 504, "detecting infrared light responsive to scattering of the plurality of infrared light dots on the surface and generating a signal" may be performed. In some examples, the detecting and generating may be performed by a sensor (e.g., sensor 120). In some examples, the signal may be an electrical signal, which may be provided to a processor (e.g., processor(s) 102) via an interface (e.g., interface 114).

At block 506, "acquiring an image of the surface" may be performed. In some examples, the image may be acquired with a camera (e.g., camera 122). In some examples, the image may be provided to the processor via the interface.

At block 508, "generating a 3D model of the surface" may be performed. The 3D model may be based, at least in part, on the signal. In some examples, the 3D model may be generated by the processor.

At block 510, "analyzing the 3D model and the image to calculate a plurality of surface characteristics" may be performed. In some examples, the surface characteristics may include at least one of a roughness of the surface, a maximum peak height, a grain size, a lesion size, a number of lesions, or a waviness. In some examples, grain size, lesion size, or number of lesions is calculated based, at least in part, on a watershed algorithm. In some examples, the analyzing may be performed by the processor. In some examples, only a portion of the 3D model may be analyzed. For example, only a region of interest indicated by a user input (e.g. via interface 114) may be analyzed. In another example, only a region of the 3D model corresponding to a region segmented in an image (e.g., a lesion segmented from an image of the face) may be analyzed.

At block 512, "analyzing the plurality of surface characteristics to generate a result" may be performed. In some examples, the result may include a diagnosis and/or a product recommendation. In some examples, the analyzing may be performed by the processor. In some examples, the processor implements a neural network to analyze the surface characteristics. In some examples, the neural network is a convolutional neural network.

At block 514, "providing the result on a display" may be performed. The display (e.g., display 116) may be included with a computing device (e.g., computing device 100) and/or a mobile device (e.g., mobile device 150, mobile device 200).

Figure 6:
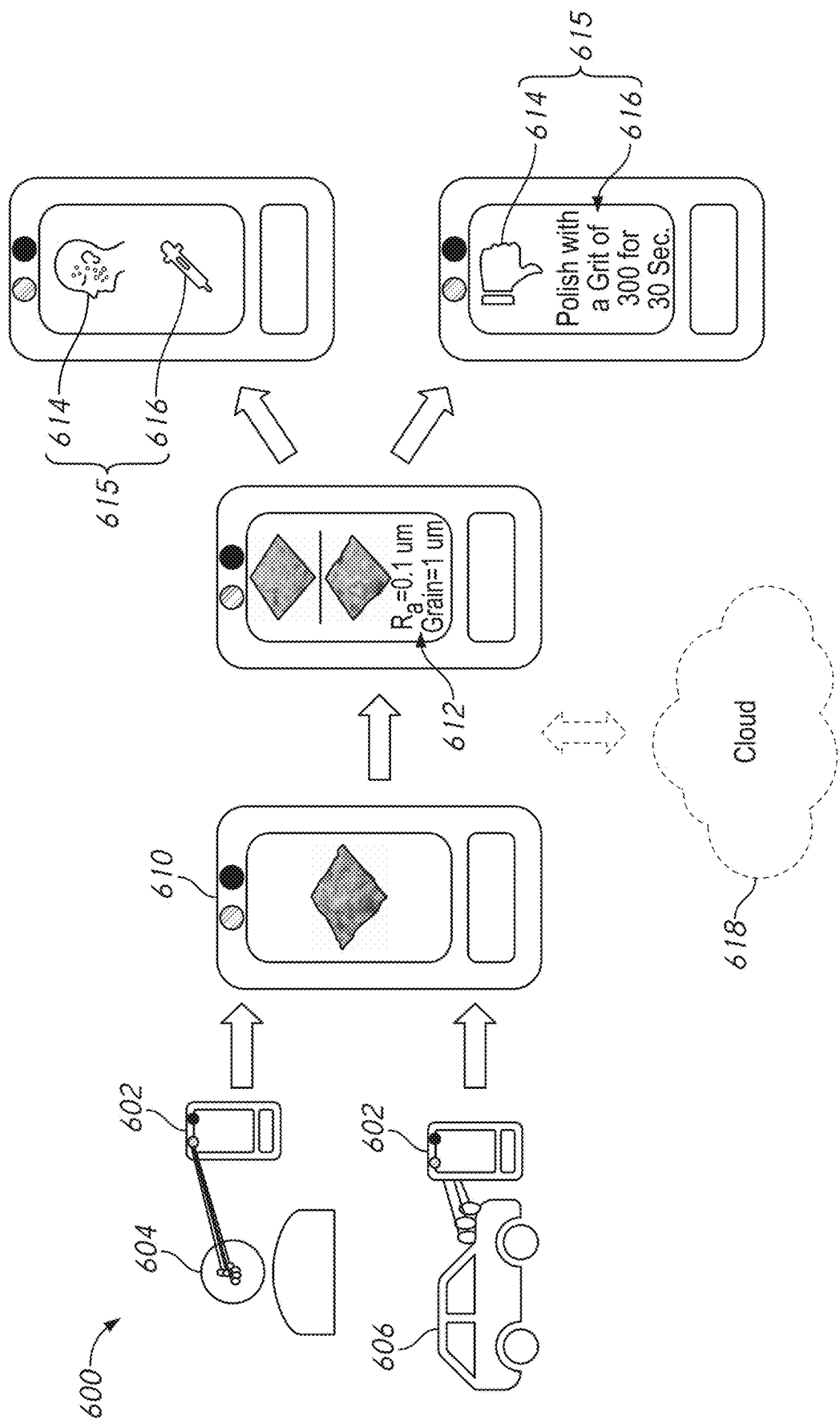
FIG. 6 is a graphical representation of applications in accordance with examples of the present disclosure.

FIG. 6 is a graphical representation 600 of applications in accordance with examples of the present disclosure. As shown in FIG. 6, a mobile device 602 may be used to scan a surface with light (e.g., infrared light) and/or acquire an image of the surface. As described previously, in some examples, the scan may include projecting dots on the surface. In some applications, the surface may be the skin or other tissue of a subject 604 (e.g., a patient). In some applications, the surface may be the surface of an object 606, such as a coat of paint on a car or the surface of a diamond. The mobile device 602 may include computing device 100 in some examples. In some examples, mobile device 602 may include mobile device 150 and/or mobile device 200.

The mobile device 602 may analyze signals generated by the light scattered from the surface back to the mobile device 602 and/or analyze the acquired image to generate a 3D model 608 of the surface. In some examples, the 3D model 608 may be provided on a display 610 of the mobile device 602. Optionally, in some examples, the mobile device 602 may provide the signals and/or image to a remote computing device, such as a cloud computing device 618. In these examples, the cloud computing device 618 may analyze the signals and/or image to generate the 3D model 608 and provide the 3D model to the mobile device 602 for display.

The mobile device 602 may analyze the 3D model 608 and calculate a value for a surface characteristic (e.g., roughness, grain size, waviness, maximum peak height). In some examples, the mobile device 602 may calculate multiple values for a same surface characteristic and/or values for multiple surface characteristics. The surface characteristic values 612 may be provided via a GUI provided on the display 610 in some examples. Optionally, in some examples, the mobile device 602 may provide the 3D model to another computing device (e.g., the cloud computing device 618). In these examples, the other computing device (e.g., cloud computing device 618) may analyze the 3D model 608 and provide the surface characteristic values 612 to the mobile device 602.

The mobile device 602 may analyze the surface characteristics 612 to generate a result 615. In some examples, the surface characteristics 612 are compared against a database of surface characteristics to generate the result 615 in some examples, the surface characteristic values 612 are analyzed by one or more machine learning models to generate the result 615. In some examples, the result 615 is provided via the GUI on the display 610 of the mobile device 602. Optionally, in some examples, the mobile device 602 may provide the surface characteristic values 612 to the cloud computing device 618. The cloud computing device 618 may analyze the surface characteristic values 612 and provide the result to the mobile device 602.

In some examples, the result 615 may include a diagnosis 614 and/or a product recommendation 616. In the applications where the surface is a tissue of the subject 604, the diagnosis 614 may include an indication of a disease state (e.g., benign versus cancerous) or other condition (e.g., dry skin). The product recommendation 616 may include a medication and/or treatment regimen to treat the condition indicated by the diagnosis 614. In applications where the surface is the surface of an object 606, the diagnosis 614 may include an indication that a product meets or does not meet specifications (e.g., roughness is within acceptable limits). The product recommendation 616 may include a product specification (e.g., grit level for polishing) and/or a process specification (e.g., time for polishing).

As illustrated in FIG. 6, in both biological and non-biological applications, a mobile device is able to provide information on characteristics of surfaces and/or results based on analysis of the surface. Accordingly, the devices, systems, methods, and apparatuses of the present disclosure may allow users to acquire data on surface characteristics and analyze that data without expensive and/or specialized equipment.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. A device comprising:
   an infrared light source configured to project a plurality of dots of infrared light onto a surface;
   a sensor mounted to a same substrate or within a same enclosure as the infrared light source, the sensor configured to detect signals responsive to the infrared light scattering off the surface; and
   a processor mounted to the same substrate or within the same enclosure or as the infrared light source and the sensor, the processor configured to:
   generate a three-dimensional (3D) model of the surface based, at least in part, on the signals detected by the sensor;
   calculate an overall shape of the surface and subtract the overall shape of the surface from the 3D model prior to analyzing the 3D model;
   calculate one or more characteristics of the 3D model comprising at least one of a roughness of the surface, a maximum peak height, a grain size, a lesion size, a number of lesions, or a waviness, or any combination thereof;
   identify a data set associated with the 3D model based, at least in part, on at least one of the roughness, the maximum peak height, the grain size, the lesion size, the number of lesions, or the waviness; and
   output data from the data set via a graphical user interface (GUI) of the device.

2. The device of claim 1, further comprising a camera, wherein the camera is configured to acquire an image of the surface, wherein at least one of the roughness, the maximum peak height, the grain size, the lesion size, the number of lesions, or the waviness is calculated based, at least in part, on the image.

3. The device of claim 1, wherein the surface roughness is calculated using an arithmetical mean deviation, a root mean squared, a maximum valley depth, or a combination thereof.

4. The device of claim 1, wherein at least one of the grain size, the lesion size, or the number of lesions is calculated using a watershed algorithm.

5. The mobile device of claim 1, wherein the processor implements a machine learning model to analyze the roughness, the maximum peak height, the grain size, the lesion size, the number of lesions, or the waviness in order to provide the data from the data set.

6. The device of claim 5, wherein the machine learning model is a neural network.

7. The device of claim 1, wherein the surface includes skin cells.

8. The device of claim 1, further comprising a display, wherein the GUI provides a rendering of the 3D model, an image of the surface, a product recommendation, a diagnosis, or a combination thereof to the display, wherein the product recommendation, the diagnosis, or a combination thereof are included in the data set.

9. The device of claim 1, wherein the device is further configured to provide the at least one of the roughness of the surface, the maximum peak height, the grain size, the lesion size, the number of lesions, or the waviness to a cloud computing device for analysis, wherein the cloud computing device is configured to provide the data set associated with the 3D model to the processor.

10. The device of claim 1, further comprising at least one of a computer, tablet computer, smartphone, or wearable computing device.

11. The device of claim 1, further comprising a polarizer configured to polarize the infrared light or an analyzer configured to polarize the signals.

12. A device comprising:
an infrared light source configured to project a plurality of dots of infrared light onto a surface;
a sensor mounted to a same substrate or within a same enclosure as the infrared light source the sensor configured to detect signals responsive to the infrared light scattering off the surface;
a processor mounted to the same substrate or within the same enclosure or as the infrared light source and the sensor, the processor configured to:
generate a three-dimensional (3D) model of the surface based, at least in part, on the signals detected by the sensor;
calculate one or more characteristics of the 3D model comprising at least one of a roughness of the surface, a maximum peak height, a grain size, a lesion size, a number of lesions, or a waviness, or any combination thereof;
identify a data set associated with the 3D model based, at least in part, on at least one of the roughness, the maximum peak height, the grain size, the lesion size, the number of lesions, or the waviness; and
output data from the data set via a graphical user interface (GUI) of the device; and
at least one light-emitting diodes (LEDs) configured to emit light for a preconfigured duration in response to a user input or command from an application on the device, wherein the sensor is configured to detect additional signals responsive to light from the at least one LED scattering off the surface, wherein at least one of the roughness, the maximum peak height, the grain size, the lesion size, the number of lesions, or the waviness is calculated based, at least in part, on the additional signals.

13. A device comprising:
an infrared light source configured to project a plurality of dots of infrared light onto a surface;
a sensor mounted to a same substrate or within a same enclosure as the infrared light source the sensor configured to detect signals responsive to the infrared light scattering off the surface;
a processor mounted to the same substrate or within the same enclosure or as the infrared light source and the sensor the processor configured to;
generate a three-dimensional (3D) model of the surface based, at least in part on the signals detected by the sensor;
calculate one or more characteristics of the 3D model comprising at least one of a roughness of the surface, a maximum peak height, a grain size, a lesion size, a number of lesions, or a waviness, or any combination thereof;
identify a data set associated with the 3D model based, at least in part, on at least one of the roughness, the maximum peak height, the grain size, the lesion size, the number of lesions, or the waviness; and
output data from the data set via a graphical user interface (GUI) of the device;
at least one light-emitting diodes (LEDs) configured to emit light for a preconfigured duration in response to a user input or command from an application on the device; and
a complementary metal oxide semiconductor (CMOS) image sensor, configured to acquire an image of the surface with the at least one LED, wherein at least one of the roughness, the maximum peak height, the grain size, the lesion size, the number of lesions, or the waviness is calculated based, at least in part, on the image.

14. A method comprising:
illuminating a surface with an infrared light source of a mobile device;
receiving signals responsive to infrared light from the infrared light source scattering on the surface;
generating a three dimensional (3D) model of the surface, based, at least in part, on the signals;
calculating an overall shape of the surface;
subtracting the overall shape of the surface from the 3D model;
after the subtracting, generating a value for at least one characteristic of the surface from the 3D model; and
providing a data set based, at least in part, on the value.

15. The method of claim 14, wherein the at least one characteristic of the surface includes at least one of a roughness of the surface, a maximum peak height, a grain size, a lesion size, a number of lesions, or a waviness.

16. The method of claim 14, further comprising comparing the value for the at least one characteristic of the surface to values in a database to generate the data set.

17. The method of claim 14, further comprising analyzing the value for the at least one characteristic of the surface with a machine learning model to provide the data set.

18. The method of claim 14, further comprising:
acquiring an image of the surface with a camera of the mobile device; and
generating the 3D model of the surface based, at least in part, on the image.

19. The method of claim 14, further comprising:
acquiring an image of the surface with a camera of the mobile device; and
generating the value for the at least one characteristic of the surface based, at least in part, on the image.

20. The method of claim 19, wherein the image is acquired with a light emitting diode.

21. The method of claim 14, further comprising polarizing the infrared light.

22. The method of claim 14, wherein the data set includes a product recommendation, a diagnosis, or a combination thereof.

23. The method of claim 14, further comprising displaying a rendering of the 3D model.

24. An apparatus comprising:
an infrared light source configured to emit infrared light on a surface;
a sensor configured to detect the infrared light scattered on the surface and generate a signal based, at least in part, on the infrared light detected;
a processor configured to:
generate a three-dimensional (3D) model of the surface based, at least in part, on the signal;
calculate an overall shape of the surface and subtract the overall shape of the surface from the 3D model prior to analyzing the 3D model;
calculate a plurality of surface characteristics based, at least in part, on the 3D model;
identify a data set associated with the plurality of surface characteristics, wherein the data set includes at least one of a diagnosis or a product recommendation; and
provide data from the data set via a graphical user interface, wherein the infrared light source, sensor, and processor are included on a same substrate or within a same enclosure.

25. The apparatus of claim 24, wherein the infrared light source is a dot projector.

26. The apparatus of claim 24, further comprising a camera configured to acquire an image of the surface, and the processor is further configured to analyze the image to calculate the plurality of surface characteristics, wherein the camera comprises a CMOS image sensor, a charge coupled device, or a combination thereof.

27. The apparatus of claim 24, wherein the infrared light source is a polarized light source.

28. The apparatus of claim 24, wherein the processor is configured to implement a machine learning model to analyze the plurality of surface characteristics to identify the data set.

29. The apparatus of claim 24, wherein the processor is configured to compare the plurality of surface characteristics to a database of surface characteristics to identify the data set.

30. The apparatus of claim 24, further comprising a display included on the same substrate or within the same enclosure, the display configured to display the GUI, wherein the GUI provides at least one of the diagnosis or the product recommendation, a rendering of the 3D model, or the plurality of surface characteristics on the display.

31. A method comprising:
projecting a plurality of infrared light dots on a surface;
detecting infrared light responsive to scattering of the plurality of infrared light dots on the surface;
generating a signal based, at least in part, on the infrared light detected;
acquiring an image of the surface with a camera;
generating a three dimensional (3D) model of the surface, based, at least in part, on the signal;
calculating an overall shape of the surface based at least in part on at least one of the signal and the image;
subtracting the overall shape of the surface from the 3D model;
after subtracting the overall shape of the surface from the 3D model, calculating a plurality of surface characteristics based at least in part, on the 3D model;
identifying a data set associated with the plurality of surface characteristics, wherein the data set includes a diagnosis, a product recommendation, or a combination thereof; and
providing data from the data set via a graphical user interface.

32. The method of claim 31, wherein the infrared light is polarized.

33. The method of claim 31, wherein the identifying of the data set associated with the plurality of surface characteristics is performed by a neural network.

34. The method of claim 33, wherein the neural network is a convolutional neural network.

35. The method of claim 31, wherein the plurality of surface characteristics include at least one of a roughness of the surface, a maximum peak height, a grain size, a lesion size, a number of lesions, or a waviness.

36. The method of claim 35, wherein at least one of the grain size, the lesion size, or the number of lesions is calculated based, at least in part, on a watershed algorithm.

37. The method of claim 31, wherein the identifying of the data set associated with the plurality of surface characteristics is performed by a cloud computing device.

* * * * *